(12) United States Patent
Suzuki et al.

(10) Patent No.: US 9,555,600 B2
(45) Date of Patent: Jan. 31, 2017

(54) LAMINATE

(71) Applicant: ASAHI GLASS COMPANY, LIMITED, Chiyoda-ku (JP)

(72) Inventors: Susumu Suzuki, Tokyo (JP); Naoko Okada, Tokyo (JP); Fumie Sakamoto, Tokyo (JP); Masaya Matsunaga, Tokyo (JP); Toshio Suzuki, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 0 days.

(21) Appl. No.: 14/603,940

(22) Filed: Jan. 23, 2015

(65) Prior Publication Data

US 2015/0140355 A1    May 21, 2015

Related U.S. Application Data

(63) Continuation of application No. PCT/JP2013/069829, filed on Jul. 22, 2013.

(30) Foreign Application Priority Data

Jul. 24, 2012    (JP) .................. 2012-163954

(51) Int. Cl.
| | | |
|---|---|---|
| *B32B 15/04* | (2006.01) | |
| *B32B 17/06* | (2006.01) | |
| *B32B 7/02* | (2006.01) | |
| *C03C 17/36* | (2006.01) | |
| *G02B 5/26* | (2006.01) | |
| *B32B 15/20* | (2006.01) | |
| *B32B 17/00* | (2006.01) | |

(52) U.S. Cl.
CPC ................ *B32B 15/04* (2013.01); *B32B 7/02* (2013.01); *B32B 15/20* (2013.01); *B32B 17/00* (2013.01); *C03C 17/36* (2013.01); *C03C 17/366* (2013.01); *C03C 17/3626* (2013.01); *C03C 17/3644* (2013.01); *G02B 5/26* (2013.01); *B32B 2307/412* (2013.01); *B32B 2419/00* (2013.01); *B32B 2605/00* (2013.01); *Y10T 428/12549* (2015.01); *Y10T 428/24942* (2015.01); *Y10T 428/24975* (2015.01); *Y10T 428/31678* (2015.04)

(58) Field of Classification Search
USPC ....... 428/426, 428, 432, 433, 434, 688, 689, 428/697, 699, 701, 702
See application file for complete search history.

(56) References Cited

U.S. PATENT DOCUMENTS

| | | |
|---|---|---|
| 6,576,349 B2 | 6/2003 | Lingle et al. |
| 7,670,641 B2 | 3/2010 | Hoffman et al. |
| (Continued) | | |

FOREIGN PATENT DOCUMENTS

| | | |
|---|---|---|
| JP | 7-172872 A | 7/1995 |
| JP | 11-34216 A | 2/1999 |
| (Continued) | | |

*Primary Examiner* — Lauren R Colgan
(74) *Attorney, Agent, or Firm* — Oblon, McClelland, Maier & Neustadt, L.L.P.

(57) ABSTRACT

A laminate may include the following layers in order: a transparent substrate, a first dielectric layer, a silver layer, a light-absorbing layer, a first barrier layer, and a second dielectric layer. The first dielectric layer may be in contact with the transparent substrate, and a single silver layer may be present in the laminate between the first dielectric layer and the second dielectric layer.

9 Claims, 1 Drawing Sheet

(56) References Cited

U.S. PATENT DOCUMENTS

| | | | |
|---|---|---|---|
| 7,687,149 B2 | 3/2010 | Hoffman et al. | |
| 2003/0104221 A1* | 6/2003 | Stachowiak | C03C 17/36 428/432 |
| 2004/0016202 A1 | 1/2004 | Hoffman | |
| 2004/0241406 A1* | 12/2004 | Nadaud | B32B 17/10036 428/212 |
| 2005/0042459 A1* | 2/2005 | Kriltz | B32B 17/10174 428/432 |
| 2008/0187692 A1* | 8/2008 | Roquiny et al. | 428/34 |
| 2009/0068447 A1* | 3/2009 | Blacker | C03C 17/36 428/336 |
| 2009/0136765 A1* | 5/2009 | Maschwitz et al. | 428/432 |
| 2009/0258222 A1* | 10/2009 | Roquiny et al. | 428/336 |
| 2010/0062245 A1* | 3/2010 | Martin | B32B 17/10174 428/336 |
| 2011/0261442 A1* | 10/2011 | Knoll et al. | 359/360 |
| 2012/0094112 A1 | 4/2012 | Imran | |

FOREIGN PATENT DOCUMENTS

| | | |
|---|---|---|
| JP | 2002-047033 | 2/2002 |
| JP | 2006-117482 | 5/2006 |
| JP | 2007-516144 A | 6/2007 |
| JP | 2010-500270 | 1/2010 |
| WO | WO 2008/017722 | 2/2008 |
| WO | WO 2012/050596 | 4/2012 |

\* cited by examiner

LAMINATE

TECHNICAL FIELD

The present invention relates to a laminate comprising a transparent substrate and a laminated membrane having at least a silver layer and a light-absorbing layer formed on the transparent substrate.

BACKGROUND ART

A silver layer provides neutral transmitted color and reflected color in the visible region and has a low resistivity. A silver layer having a geometrical thickness at a level of 10 nm has little absorption in the visible region and has a reflectance of several tens %. The reflectance increases as the wavelength becomes long, and in the infrared region, it has a high reflectance. A silver multilayer film comprising a silver layer sandwiched between dielectric layers, having a low reflectance in the visible region and a high reflectance in the infrared region, has an outer appearance equal to that of common glass, and has a low emissivity and a high heat ray reflectance, and accordingly it has been used for highly heat insulating Low-E glass or heat ray-reflective glass having a high transmittance. In recent years, along with an increase in the energy saving consciousness, demands for such glass are increasing. Further, since it has a low resistivity, it may be used as a transparent electrically conductive film.

Tempered glass is sometimes used as Low-E glass, for example, window glass for a building. Further, curved glass is used as window glass for an automobile. Both tempered glass and curved glass are produced by a heat treatment at a temperature of from 550° C. to 750° C. There are two methods for producing tempered glass or curved glass having a silver multilayer film. A first method is a method of forming a film on glass which has been tempered or curved. A second method is a method of forming a film on a large-sized flat glass, cutting the glass into a glass plate of a product size, and subjecting the glass to a heat treatment for tempering or curving.

The production cost is lower in the above second method of forming a film first and then cutting the glass and subjecting it to a heat treatment for tempering or curving, than a method of forming a film on glass which has been tempered or curved. It is difficult to stably produce a high performance silver multilayer film with substantially no deterioration after the heat treatment, and various know-how is required. As glass having a silver multilayer film and having the haze or the like at the time of the heat treatment suppressed, one having a NiCrOx film formed to sandwich a silver layer has been known (for example, Patent Document 1).

Further, as Low-E glass or the like, one comprising a light-absorbing layer in combination with a silver layer, in order to decrease the transmittance and to improve heat ray-shielding properties, has been known. One comprising a light-absorbing layer in combination with a silver layer may, for example, be one having a light-absorbing layer directly over a silver layer (for example, Patent Document 2 or 3).

PRIOR ART DOCUMENTS

Patent Documents

Patent Document 1: U.S. Pat. No. 6,576,349
Patent Document 2: U.S. Pat. No. 7,687,149
Patent Document 3: U.S. Pat. No. 7,670,641

DISCLOSURE OF INVENTION

Technical Problem

However, in a case where a light-absorbing layer is formed in combination with a silver layer, desired optical properties, etc. are hardly maintained after a heat treatment, and for example, the transmittance, the reflectance, the color tone of the transmitted light or the reflected light, etc. are likely to depart from the predetermined ranges, and the haze or the like is likely to occur. For example, in a case where a light-absorbing layer is provided directly over a silver layer as disclosed in Patent Document 2, the silver layer and a metal layer as the light-absorbing layer may be alloyed with each other at the time of the heat treatment, and visible defects or non-uniformity occurs in some cases. The object of the present invention is to provide a laminate comprising a silver layer and a light-absorbing layer in combination, having changes of optical properties and occurrence of a haze due to a heat treatment suppressed.

Solution to Problem

The laminate of the present invention comprises a transparent substrate and a laminated membrane provided on the transparent substrate. The laminated membrane contains, in order from the transparent substrate side, a layer having two layers of a first dielectric layer and a silver layer formed in contact with each other in this order, and a layer having three layers of a light-absorbing layer, a first barrier layer and a second dielectric layer formed in contact with one another in this order.

Advantageous Effects of Invention

According to the present invention, in a laminate comprising a laminated membrane having a silver layer and a light-absorbing layer in combination, by providing predetermined constituting layers in predetermined order, changes of optical properties and changes of the outer appearance due to a heat treatment can be suppressed.

DESCRIPTION OF EMBODIMENTS

Now, an embodiment of a laminate of the present invention will be described.

Figure 1:
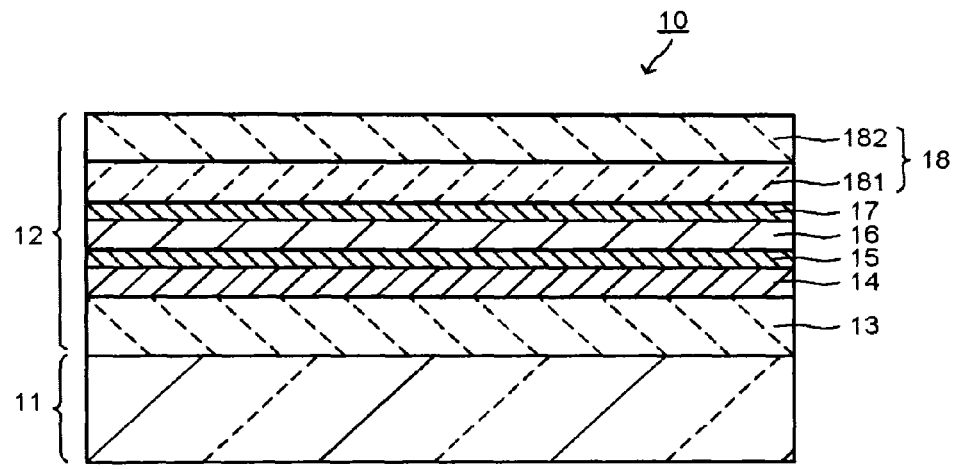
FIG. 1 is a cross-sectional view schematically illustrating one embodiment of a laminate of the present invention.

FIG. 1 is a cross-sectional view illustrating one embodiment of a laminate.

A laminate 10 comprises a laminated membrane 12 on a transparent substrate 11. The laminated membrane 12 has, for example, in order from the transparent substrate 11 side, a first dielectric layer 13, a silver layer 14, a second barrier layer 15, a light-absorbing layer 16, a first barrier layer 17 and a second dielectric layer 18. The second dielectric layer 18 has, for example, in order from the transparent substrate 11 side, a lower dielectric layer 181 and an upper dielectric layer 182.

The laminated membrane 12 has, in order from the transparent substrate 11 side, at least a layer having two layers of the first dielectric layer 13 and the silver layer 14 formed in contact with each other in this order, and a layer having three layers of the light-absorbing layer 16, the first barrier layer 17 and the second dielectric layer 18 formed in contact with one another in this order. That is, the laminated membrane 12 is formed so that the first dielectric layer 13 and the silver layer 14 are in contact with each other, and that the light-absorbing layer 16 and the first barrier layer 17 are in contact with each other and the first barrier layer 17 and the second dielectric layer 18 are in contact with each other. By such a structure, changes of optical properties and changes of the outer appearance due to a heat treatment can be suppressed.

The second barrier layer 15 disposed between the silver layer 14 and the light-absorbing layer 16 may be provided as the case requires or may not be provided. In a case where the second barrier layer 15 is provided, it is preferably provided so that the silver layer 14 and the second barrier layer 15 are in contact with each other and that the second barrier layer 15 and the light-absorbing layer 16 are in contact with each other. On the other hand, in a case where the second barrier layer 15 is not provided, for example, the laminated membrane 12 is formed so that the silver layer 14 and the light-absorbing layer 16 are in contact with each other.

Here, the light-absorbing layer is a layer having absorption in the visible region. Further, the barrier layer is a layer which suppresses deterioration of the silver layer or the like by oxidation, or a layer which suppresses reaction of the silver layer or the like with another metal layer, by part of or the entire layer itself being oxidized at the time of film formation or at the time of the heat treatment.

The transparent substrate 11 is not particularly limited, and for example, an inorganic transparent glass plate such as window glass for a building, commonly used float glass or soda lime glass produced by a roll out process may be used. As a glass plate, colorless glass such as clear glass or highly transparent glass, green glass such as heat ray-absorbing glass, or another desired color glass may be mentioned, and considering the visible light transmittance, preferred is colorless glass such as clear glass or highly transparent glass. Further, tempered glass such as air-quenched tempered glass or chemically tempered glass may be used. Further, various glass such as borosilicate glass, low-expansion glass, zero-expansion glass, low-expansion crystallized glass or zero-expansion crystallized glass may be used. The geometrical thickness of the transparent substrate 11 is not necessarily limited and is preferably, for example, from 1 to 20 mm.

The first dielectric layer 13 is provided so as to adjust the reflectance and the transmittance in the visible region by e.g. the interference effect with the silver layer 14 thereby to achieve desired optical properties of the laminate 10. The refractive index of the first dielectric layer 13 is preferably from 1.7 to 2.5, more preferably from 1.8 to 2.2, further preferably from 1.9 to 2.1. Within such a refractive index, the reflectance and the transmittance in the visible region are likely to be adjusted by e.g. the interference effect with the silver layer 14 thereby to achieve desired optical properties of the laminate 10. The refractive index means a refractive index at a wavelength of 550 nm.

The constituting material of the first dielectric layer 13 is not particularly limited so long as the above refractive index is obtained, and various metal oxides and metal nitrides may be mentioned. The metal oxide may be one containing as the main component an oxide of at least one metal selected from the group consisting of zinc, tin, niobium and titanium. Further, the metal nitride may be one containing as the main component a nitride of at least one metal selected from silicon and aluminum.

The metal oxide is particularly preferably an aluminum-doped zinc oxide or a tin-doped zinc oxide. The aluminum-doped zinc oxide is preferably one having a proportion of aluminum being from 1 to 10 atomic %, more preferably from 3 to 7 atomic %, relative to the total amount of zinc and aluminum. The tin-doped zinc oxide is preferably one having a proportion of tin being from 10 to 80 mass %, more preferably from 20 to 80 mass %, relative to the total amount of zinc and tin.

The first dielectric layer 13 may consist of a single layer as shown in the drawing, or may consist of a plurality of layers although not shown.

In the case of a single layer, the layer is preferably made of an aluminum-doped zinc oxide. The aluminum-doped zinc oxide is preferably one having a proportion of aluminum being from 1 to 10 atomic %, more preferably from 3 to 7 atomic %, relative to the total amount of zinc and aluminum. By the layer disposed closest to the silver layer 14 being made of an aluminum-doped zinc oxide, the crystallinity of the silver layer 14 formed thereon can effectively be improved.

In the case of a plurality of layers, the layer disposed closest to the silver layer 14 is preferably made of an aluminum-doped zinc oxide. The aluminum-doped zinc oxide is preferably one having a proportion of aluminum being from 1 to 10 atomic %, more preferably from 3 to 7 atomic %, relative to the total amount of zinc and aluminum. By the layer disposed closest to the silver layer 14 being made of an aluminum-doped zinc oxide, crystallinity of the silver layer 14 formed thereon may effectively be improved.

Further, in the case of a plurality of layers, the layers other than the layer disposed closest to the silver layer 14 are not necessarily limited, and are preferably made of a tin-doped zinc oxide. The tin-doped zinc oxide is preferably one having a proportion of tin being from 10 to 90 mass %, more preferably from 20 to 80 mass % relative to the total amount of zinc and tin.

The geometrical thickness of the first dielectric layer 13 is preferably from 25 to 50 nm, more preferably from 25 to 45 nm, further preferably from 25 to 40 nm as the entire thickness of the first dielectric layer 13. Within such a geometrical thickness of the first dielectric layer 13, the reflectance and the transmittance in the visible region are likely to be adjusted by e.g. the interference effect with the silver layer 14, thereby to achieve desired optical properties of the laminate 10.

The silver layer 14 contains silver as the main component and is made of silver alone or made of a silver alloy containing a metal element such as palladium. In the case of a silver alloy, the content of metal elements other than silver in the entire silver alloy is preferably at most 10 mass %, more preferably at most 5 mass %, further preferably at most 3 mass %. The silver layer 14 is preferably basically made of silver alone.

The geometrical thickness of the silver layer 14 is preferably from 5 to 25 nm, more preferably from 7 to 20 nm, further preferably from 9 to 17 nm. By the geometrical thickness of the silver layer 14 being relatively thick, the transmittance is likely to be decreased thereby to improve the heat ray-shielding properties and to achieve desired optical properties of the laminate 10.

The second barrier layer 15 is not necessarily essential, and may properly be provided depending upon e.g. the constituting material of the light-absorbing layer 16. The second barrier layer 15 is provided so as to suppress e.g. oxidation of the silver layer 14 and to prevent the silver layer 14 and the light-absorbing layer 16 from being reacted with each other at the time of the heat treatment. That is, at the time of forming another layer such as the second dielectric layer 18 on the silver layer 14 or at the time of the heat treatment for post-tempering or post-curving, the silver layer 14 may be oxidized, and the silver layer 14 and the light-absorbing layer 16 may be reacted with each other. By providing the second barrier layer 15 on the silver layer 14, oxidation of the silver layer 14 and the reaction of the silver layer 14 and the light-absorbing layer 16 are likely to be suppressed, thereby to achieve desired optical properties of the laminate 10.

The constituting material of the second barrier layer 15 is not particularly limited so long as e.g. oxidation of the silver layer 14 is effectively suppressed, and various metals and metal nitrides may be mentioned. For example, the metal may be one containing as the main component at least one metal selected from the group consisting of titanium, zirconium, hafnium, chromium, molybdenum, tungsten, vanadium, niobium, tantalum, zinc, nickel, palladium, platinum, aluminum, indium, tin and silicon. The metal nitride may be one containing as the main component a nitride of such a metal. Such a constituting material is preferred, whereby sufficient antioxidant performance, etc. are obtained.

As the constituting material of the second barrier layer 15, particularly, titanium, zinc, tin or a zinc-tin alloy is suitable. The zinc-tin alloy is preferably, for example, one having a proportion of tin being from 10 to 90 mass %, more preferably from 20 to 80 mass % relative to the total amount of zinc and tin. By using such a constituting material, sufficient antioxidant performance, etc. are obtained and in addition, changes of optical properties and occurrence of a haze due to the heat treatment may effectively be suppressed.

In a case where the second barrier layer 15 is provided, its geometrical thickness is preferably from 1 to 10 nm, more preferably from 1 to 5 nm. By the geometrical thickness of the second barrier layer 15 being at least 1 nm, sufficient antioxidant performance, etc. may be obtained. Further, by the thickness being at most 10 nm, a decrease of optical properties intrinsic in the laminate 10 may be suppressed.

Further, the second barrier layer 15 is basically formed as a metal layer or a metal nitride layer, and at the time of forming another layer in an oxidizing atmosphere thereafter or at the time of the heat treatment for post-tempering or post-curving, part of or the entire film may be oxidized to be converted to a metal oxide film in some cases. Therefore, the second barrier layer 15 is not necessarily present as a metal film or a metal nitride film in a state of the laminate 10 or in a state after the heat treatment for post-tempering or post-curving.

The light-absorbing layer 16 is provided so as to help absorption of the visible light and to decrease the visible light transmittance, etc. As the light-absorbing layer 16, a known light-absorbing layer may be employed. The constituting material of the light-absorbing layer 16 may be a metal, a metal oxide or a metal nitride which absorbs light in the visible region.

The metal may, for example, be suitably a nickel-chromium alloy or a nickel-aluminum alloy. Among them, particularly a nickel-aluminum alloy is suitable, and preferred is one having a proportion of nickel being from 50 to 90 mass %, more preferably from 60 to 80 mass % relative to the total amount of nickel and aluminum. In a case where the light-absorbing layer 16 is made of a metal, particularly a nickel-aluminum alloy, it is preferred to provide the second barrier layer 15 between the silver layer 14 and the light-absorbing layer 16. By providing the second barrier layer 15, oxidation of the silver layer 14 may be suppressed, or the reaction of the silver layer 14 and the light-absorbing layer 16 may be prevented, thereby to suppress e.g. a decrease of optical properties.

Further, the metal nitride may, for example, be suitably a metal nitride shifting to the metal side from the stoichiometry, such as silicon nitride ($SiN_x$($x$=0.1 to 1.33)), aluminum nitride ($AlN_x$($x$=0.1 to 1.0)) or chromium nitride ($CrN_x$ ($x$=0.1 to 1.0)). Among them, for example, chromium nitride ($CrN_x$($x$=0.1 to 1.0, particularly $x$=1.0)) is suitable.

Here, in a case where the light-absorbing layer 16 is made of a metal nitride, particularly a metal nitride shifting to the metal side from the stoichiometry, the second barrier layer 15 may be provided between the silver layer 14 and the light-absorbing layer 16, however, the second barrier layer 14 is not necessarily provided. By not providing the second barrier layer 15, desired optical properties of the laminate 10 are likely to be achieved.

The geometrical thickness of the light-absorbing layer 16 is preferably from 1 to 10 nm. By the thickness being at least 1 nm, the light-absorbing layer 16 may help absorption of the visible light thereby to effectively decrease the visible light transmittance, etc. By the thickness being at most 10 nm, excessive absorption of the visible light is likely to be suppressed, thereby to achieve desired optical properties of the laminate 10. The geometrical thickness of the light-absorbing layer 16 is preferably from 1 to 9 nm, more preferably from 1 to 8 nm, further preferably from 1 to 5 nm.

The first barrier layer 17 is an essential component and is provided so as to suppress e.g. oxidation of the silver layer 14 and the light-absorbing layer 16. That is, at the time of forming another layer such as the second dielectric layer 18 on the silver layer 14 and the light-absorbing layer 16, or at the time of the heat treatment for post-tempering or post-curving, the silver layer 14 and the light-absorbing layer 16 may be oxidized, however, by providing the first barrier layer 17, oxidation of the silver layer 14 and the light-absorbing layer 16 is likely to be suppressed thereby to achieve desired optical properties of the laminate 10.

The constituting material of the first barrier layer 17 is not particularly limited so long as e.g. oxidation of the silver layer 14 and the light-absorbing layer 16 is effectively suppressed, and various metals and metal nitrides may be mentioned. For example, the metal may be one containing as the main component at least one metal selected from the group consisting of titanium, zirconium, hafnium, chromium, molybdenum, tungsten, vanadium, niobium, tantalum, zinc, nickel, palladium, platinum, aluminum, indium, tin and silicon. The metal nitride may be one containing as the main component a nitride of such a metal. Such a constituting material is preferred, whereby sufficient antioxidant performance is obtained.

The constituting material of the first barrier layer 17 is particularly suitably titanium, zinc, tin or a zinc-tin alloy. The zinc-tin alloy is preferably, for example, one having a proportion of tin being from 10 to 90 mass %, more preferably from 20 to 80 mass % relative to the total amount of zinc and tin. By using such a constituting material, sufficient antioxidant performance is obtained and in addition, changes of optical properties and occurrence of a haze due to the heat treatment may effectively be suppressed.

The geometrical thickness of the first barrier layer 17 is preferably from 1 to 10 nm, more preferably from 1 to 5 nm. By the geometrical thickness of the first barrier layer 17 being at least 1 nm, sufficient antioxidant may be obtained. Further, by the thickness being at most 10 nm, a decrease of optical properties intrinsic in the laminate 10 may be suppressed.

The first barrier layer 17 is basically formed as a metal film or a metal nitride film, however, at the time of forming another layer in an oxidizing atmosphere thereafter or at the time of the heat treatment for post-tempering or post-curving, part of or the entire film may be oxidized to be converted into a metal oxide film in some cases. Accordingly, the first barrier layer 17 is not necessarily present as a metal film or a metal nitride film in a state of the laminate 10 or in a state after the heat treatment for post-tempering or post-curving.

The second dielectric layer 18 i.e. the lower dielectric layer 181 and the upper dielectric layer 182 are provided so as to adjust the reflectance and the transmittance in the visible region by e.g. the interference effect with the silver layer 14 thereby to achieve desired optical properties of the laminate 10. The second dielectric layer 18 i.e. the lower dielectric layer 181 and the upper dielectric layer 182 respectively have a refractive index of preferably from 1.7 to 2.5, more preferably from 1.8 to 2.2, further preferably from 1.9 to 2.1. Within such a refractive index, the reflectance and the transmittance in the visible region are likely to be adjusted by e.g. the interference effect with the silver layer 14 thereby to achieve desired optical properties of the laminate 10.

The lower dielectric layer 181 and the upper dielectric layer 182 are not particularly limited so long as the above refractive indices are obtained, and various metal oxides and metal nitrides may be mentioned. The metal oxide may be one containing as the main component an oxide of at least one metal selected from the group consisting of zinc, tin, niobium and titanium. Further, the metal nitride may be one containing as the main component a nitride of at least one metal selected from silicon and aluminum.

The metal oxide is particularly suitably an aluminum-doped zinc oxide or a tin-doped zinc oxide. The aluminum-doped zinc oxide is preferably one having a proportion of aluminum being from 1 to 10 atomic %, more preferably from 3 to 7 atomic % relative to the total amount of zinc and aluminum. The tin-doped zinc oxide is preferably one having a proportion of tin being from 10 to 90 mass %, more preferably from 20 to 80 mass % relative to the total amount of zinc and tin.

The second dielectric layer 18 does not necessarily have a two-layer structure consisting of the lower dielectric layer 181 and the upper dielectric layer 182 as shown in the drawing, and may consist of a single layer or a plurality of layers of three or more, although not shown. In the case of a single layer, it may be suitably made of an aluminum-doped zinc oxide or a tin-doped zinc oxide. Further, in the case of a plurality of layers, an aluminum-doped zinc oxide layer and a tin-doped zinc oxide layer are preferably used in combination. In such a case, the order of lamination is not particularly limited, and in the case of a two-layer structure for example, in order from the transparent substrate 11 side, an aluminum-doped zinc oxide layer and a tin-doped zinc oxide layer may be formed, or a tin-doped zinc oxide layer and an aluminum-doped zinc oxide layer may be formed.

The geometrical thickness of the second dielectric layer 18 is preferably from 25 to 50 nm, more preferably from 25 to 45 nm, further preferably from 25 to 40 nm as the entire thickness of the second dielectric layer 18. Within such a geometrical thickness of the second dielectric layer 18, the reflectance and the transmittance in the visible region are likely to be adjusted by e.g. the interference effect with the silver layer 14, thereby to achieve desired optical properties of the laminate 10.

On the second dielectric layer 18, as the case requires, and within a range not to depart from the scope of the present invention, an upper barrier layer, an upper protective layer to improve the abrasion resistance, or the like may be provided.

As the upper barrier layer, various metals and metal nitrides may be mentioned. For example, the metal may be one containing as the main component at least one metal selected from the group consisting of titanium, zirconium, hafnium, chromium, molybdenum, tungsten, vanadium, niobium, tantalum, zinc, nickel, palladium, platinum, aluminum, indium, tin and silicon. The metal nitride may be one containing as the main component a nitride of such a metal. The metal nitride may be one shifting to the metal side from the stoichiometry. Such a metal nitride may be suitably titanium nitride (TiN$_x$(x=0.1 to 1.0)). Further, the upper barrier layer may be made of a metal oxide shifting to the metal side from the stoichiometry. Such a metal oxide may be suitably titanium oxide (TiO$_x$(x=0.1 to 2.0)).

The upper barrier layer may consist of a single layer or a plurality of layers. The geometrical thickness of the upper barrier layer is preferably from 1 to 10 nm, more preferably from 1 to 5 nm as the entire thickness of the upper barrier layer. The upper barrier layer is basically formed as a metal film or a metal nitride film, however, part of or the entire film may be oxidized to be converted to a metal oxide film during post-tempering or post-curving in some cases. Accordingly, the upper barrier layer is not necessarily present as a metal film or a metal nitride film in a state after the heat treatment for post-tempering or post-curving.

The upper protective layer is not particularly limited so long as the abrasion resistance is improved, and may, for example, be suitably one made of carbon. The geometrical thickness of the upper protective layer is preferably from 1 to 10 nm, more preferably from 1 to 5 nm. By the geometrical thickness of the upper protective layer being at least 1 nm, the abrasion resistance may effectively be improved. Further, by the geometrical thickness of the upper protective layer being at most 10 nm, desired optical properties of the laminate 10 are likely to be achieved.

In a case where the upper protective layer is made of carbon, it is oxidized during the heat treatment for post-tempering or post-curving and part of or the entire layer disappears. Accordingly, the upper protective layer is not necessarily present after the heat treatment for post-tempering or post-curving.

Now, suitable specific examples of the laminate 10 according to this embodiment will be described.

The laminate 10 according to a first specific example comprises a transparent substrate 11 consisting of a glass plate, and on the transparent substrate 11, in order from the transparent substrate 11 side, a first dielectric layer 13 made of an aluminum-doped zinc oxide, a silver layer 14 made of silver, a second barrier layer 15 made of titanium, a light-absorbing layer 16 made of a nickel-aluminum alloy, a first barrier layer 17 made of titanium, and a second dielectric layer 18 consisting of a lower dielectric layer 181 made of a tin-doped zinc oxide and an upper dielectric layer 182 made of an aluminum-doped zinc oxide.

In such a case, it is preferred that the geometrical thickness of the first dielectric layer 13 is from 10 to 50 nm, the geometrical thickness of the silver layer 14 is from 5 to 30 nm, the geometrical thickness of the second barrier layer 15 is from 0.5 to 5 nm, the geometrical thickness of the light-absorbing layer 16 is from 1 to 10 nm, the geometrical thickness of the first barrier layer 17 is from 1 to 5 nm, the geometrical thickness of the lower dielectric layer 181 is from 1 to 100 nm, and the geometrical thickness of the upper dielectric layer 182 is from 1 to 100 nm.

The laminate 10 according to a second specific example is the same as the first specific example except that the second barrier layer 15 and the first barrier layer 17 are made of a zinc-tin alloy. That is, it comprises a transparent substrate 11 consisting of a glass plate, and on the transparent substrate 11, in order from the transparent substrate 11 side, a first dielectric layer 13 made of an aluminum-doped zinc oxide, a silver layer 14 made of silver, a second barrier layer 15 made of a zinc-tin alloy, a light-absorbing layer 16 made of a nickel-aluminum alloy, a first barrier layer 17 made of a zinc-tin alloy, and a second dielectric layer 18 consisting of a lower dielectric layer 181 made of a tin-doped zinc oxide and an upper dielectric layer 182 made of an aluminum-doped zinc oxide.

In such a case, it is preferred that the geometrical thickness of the first dielectric layer 13 is from 10 to 50 nm, the geometrical thickness of the silver layer 14 is from 5 to 30 nm, the geometrical thickness of the second barrier layer 15 is from 0.5 to 20 nm, the geometrical thickness of the light-absorbing layer 16 is from 1 to 10 nm, the geometrical thickness of the first barrier layer 17 is from 1 to 5 nm, the geometrical thickness of the lower dielectric layer 181 is from 1 to 100 nm, and the geometrical thickness of the upper dielectric layer 182 is from 1 to 100 nm.

The laminate 10 according to a third specific example is the same as the first or second specific example except that the light-absorbing layer 16 is made of chromium nitride ($CrN_x$(x=0.1 to 1.0)) and no second barrier layer 15 is provided between the silver layer 14 and the light-absorbing layer 16.

That is, the laminate 10 according to a third specific example comprises a transparent substrate 11 consisting of a glass plate, and on the transparent substrate 11, in order from the transparent substrate 11 side, a first dielectric layer 13 made of an aluminum-doped zinc oxide, a silver layer 14 made of silver, a light-absorbing layer 16 made of chromium nitride ($CrN_x$(x=0.1 to 1.0)), a first barrier layer 17 made of titanium, a second dielectric layer 18 consisting of a lower dielectric layer 181 made of a tin-doped zinc oxide and an upper dielectric layer 182 made of an aluminum-doped zinc oxide, an upper barrier layer consisting of a titanium nitride (TIN) layer and an upper protective layer consisting of a titanium oxide ($TiO_2$) layer.

In such a case, it is preferred that the geometrical thickness of the first dielectric layer 13 is from 10 to 50 nm, the geometrical thickness of the silver layer 14 is from 5 to 30 nm, the geometrical thickness of the light-absorbing layer 16 is from 1 to 5 nm, the geometrical thickness of the first barrier layer 17 is from 1 to 5 nm, the geometrical thickness of the lower dielectric layer 181 is from 1 to 100 nm, the geometrical thickness of the upper dielectric layer 182 is from 1 to 100 nm, the geometrical thickness of the upper barrier layer is from 1 to 5 nm, and the geometrical thickness of the upper protective layer is from 1 to 10 nm.

The laminate according to a fourth specific example is different from the laminate 10 according to a third specific example in the structure of the first dielectric layer 13, the second dielectric layer 18, the upper barrier layer and the upper protective layer. The structure of a fourth specific example is particularly preferred, whereby changes of optical properties and occurrence of a haze due to the heat treatment may effectively be suppressed.

The laminate 10 according to a fourth specific example comprises a transparent substrate 11 consisting of a glass plate, and on the transparent substrate 11, in order from the transparent substrate 11 side, a first dielectric layer 13 consisting of a tin-doped zinc oxide layer and an aluminum-doped zinc oxide layer, a silver layer 14 made of silver, a light-absorbing layer 16 made of chromium nitride ($CrN_x$ (x=0.1 to 1.0)), a first barrier layer 17 made of titanium, a second dielectric layer 18 consisting of a lower dielectric layer 181 made of an aluminum-doped zinc oxide and an upper dielectric layer 182 made of a tin-doped zinc oxide, an upper barrier layer consisting of a titanium nitride ($TiN_x$ (x=0.1 to 1.0)) layer and a titanium oxide ($TiO_x$(x=0.1 to 2.0)) layer, and a protective layer made of carbon.

In such a case, it is preferred that the geometrical thickness of the tin-doped zinc oxide layer in the first dielectric layer 13 is from 1 to 50 nm, the geometrical thickness of the aluminum-doped zinc oxide layer is from 1 to 50 nm, the geometrical thickness of the silver layer 14 is from 5 to 30 nm, the geometrical thickness of the light-absorbing layer 16 is from 1 to 5 nm, the geometrical thickness of the first barrier layer 17 is from 1 to 5 nm, the geometrical thickness of the lower dielectric layer 181 is from 1 to 100 nm, the geometrical thickness of the upper dielectric layer 182 is from 1 to 100 nm, the geometrical thickness of the titanium nitride ($TiN_x$(x=0.1 to 1.0)) layer is from 0.5 to 10 nm, the geometrical thickness of the titanium oxide ($TiO_x$(x=0.1 to 2.0)) layer is from 1 to 10 nm, and the geometrical thickness of the upper protective layer consisting of a carbon layer is preferably from 1 to 10 nm.

Such a laminate 10 preferably has the following optical properties, particularly preferably has the following optical properties after subjected to a heat treatment at 730° C. in the air for 4 minutes. Here, a heat treatment is commonly carried out in the air at from 650 to 750° C. for from 1 to 10 minutes.

The solar heat gain coefficient (SHGC) is preferably from 0.35 to 0.45. The solar heat gain coefficient (SHGC) is a measure how heat generated by the sunlight is shielded. That is, the solar heat gain coefficient (SHGC) is a proportion of incident solar radiation which enters and is directly transmitted, and incident solar radiation which is absorbed and is emitted inwardly. The solar heat gain coefficient (SHGC) is represented by a number ranging from 0 to 1. The lower solar heat gain coefficient (SHGC) represents less solar heat transmitted. Here, the solar heat gain coefficient (SHGC) is calculated, for example, with respect to double glazing having a structure of glass plate (thickness: 3 mm)/air layer (thickness: 12 mm)/glass plate (thickness: 6 mm). The laminate 10 is disposed on the air layer side of the glass plate (3 mm).

The visible light transmittance (Tv) is preferably from 60 to 75%. Further, the visible light reflectance (Rv) on the transparent substrate 11 side (hereinafter referred to simply as the substrate side) is preferably from 2 to 30%, more preferably from 15 to 26%. The visible light reflectance (Rv) on the side opposite from the substrate side (hereinafter referred to simply as the membrane side) is preferably from 2 to 30%, more preferably from 12 to 21%. The difference between the visible light reflectance (Rv) on the substrate side and the visible light reflectance (Rv) on the membrane side is preferably at least 5%. The visible light transmittance (Tv) and the visible light reflectance (Rv) are both defined in JIS R3106:1998.

Further, the transmitted light through and the reflected light from the laminate 10 preferably has the following color tones. That is, in the L*a*b* colorimetric system, the transmitted light has a* smaller than 0 and b* smaller than 9. Further, the reflected light on the substrate side has a* and b* smaller than 0. The reflected light on the membrane side has a* smaller than 5 and b* smaller than 0.

With respect to a glass plate for a building, a low solar heat gain coefficient is required from the viewpoint of the air-conditioning efficiency and the like, and the color tones of the transmitted light and the reflected light are important from the viewpoint of the design. Particularly, with respect to a glass plate for a high-rise building, a relative low visible light transmittance is preferred for antidazzle purpose and the like. A laminate having the above optical properties, which has a relatively low visible light transmittance and a relatively large difference between the visible light reflectance (Rv) on the substrate side and the visible light reflectance (Rv) on the membrane side, is suitably used as a glass plate for a high-rise building, specifically, for a window glass for a building and the like.

Further, the laminate 10 has a haze, particularly a haze after the heat treatment of preferably from 0 to 1.0%. The haze is determined in accordance with JIS K6714. Further, the laminate 10 has a sheet resistance, particularly a sheet resistance after the heat treatment of preferably from 0.1 to 20Ω/□. The sheet resistance is a measure how the infrared energy is reflected.

The respective layers on the transparent substrate 11 may be formed by a conventional physical or chemical vapor deposition method. As a preferred forming method, a sputtering method may be mentioned. The sputtering method may be DC sputtering using a metal target, or AC and RF sputtering using metal and non-metal targets. In all cases, magnetron sputtering may be employed. Sputtering may be carried out, as the case requires, in an inert gas or in a reactive gas.

The laminate 10 of the present invention may be suitably used as double glazing.

Figure 2:
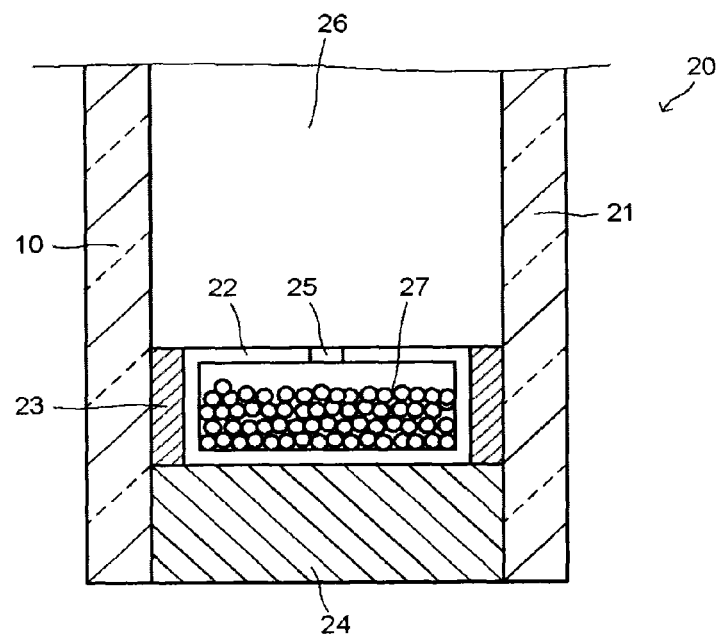
FIG. 2 is a partial cross-sectional view illustrating one embodiment of double glazing using the laminate of the present invention.

FIG. 2 illustrates one example of double glazing 20. Double glazing 20 comprises, for example, a laminate 10 and a glass plate 21 disposed with a predetermined distance by means of a spacer 22. The space between the laminate 10 and the spacer 22, and the space between the glass plate 21 and the spacer 22, are sealed by a primary sealing material 23. Further, the peripheral portion between the laminate 10 and the glass plate 21 is sealed by a secondary sealing material 24. The spacer 22 is filled with a drying agent 27 to suppress dew condensation in a hollow layer 26 through a penetrating pore 25. Further, in the hollow layer 26, the air, an argon gas or the like is included. Usually, the laminate 10 is disposed on the exterior side to the glass plate 21 so that the transparent substrate 11 side is opposite from the hollow layer.

The embodiment of the laminate has been described above, however, the laminate is not limited to one having only one silver layer, and may be one having two or more silver layers. For example, a laminate having two or more silver layers may be one having a structure of the above-mentioned laminate and further having a constituting membrane having, in order from the transparent substrate 11 side, a first dielectric layer 13, a silver layer 14, a light-absorbing layer 16 and a first barrier layer 17, thereby having two silver layers. Further, the laminate is suitable for a building but is not necessarily limited for a building, and may be used for a vehicle such as an automobile within an applicable range.

EXAMPLES

Now, the present invention will be described in further detail with reference to Examples.

Example 1

A laminate having a membrane structure as shown in Table 1 was prepared by a sputtering method. As a sputtering apparatus, an in-line sputtering apparatus in which targets for forming the respective layers were attached in a sputtering chamber was used.

First, a cleaned soda lime glass plate having a geometrical thickness of 3 mm was introduced to the in-line sputtering apparatus, and the apparatus was evacuated of air to a degree of vacuum of $2 \times 10^{-6}$ Torr or below in a load lock chamber. Then, the glass plate was introduced into a sputtering chamber, and sequentially, films were formed to achieve the membrane structure as shown in Table 1.

That is, on the glass plate surface, a titanium oxide ($TiO_2$) layer and an aluminum-doped zinc oxide layer (a proportion of aluminum being 5.0 atomic % relative to the total amount of aluminum and zinc) as a first dielectric layer, a silver layer, a titanium layer as a second barrier layer, a nickel-aluminum alloy layer (a proportion of nickel being 80 mass % relative to the total amount of nickel and aluminum) as a light-absorbing layer, a titanium layer as a first barrier layer, a tin-doped zinc oxide layer (a proportion of tin being 50 mass % relative to the total amount of tin and zinc) as a lower dielectric layer of a second dielectric layer and an aluminum-doped zinc oxide layer (a proportion of aluminum being 5.0 atomic % relative to the total amount of zinc and aluminum) as an upper dielectric layer were sequentially formed to prepare a laminate.

Here, the aluminum-doped zinc oxide layer was formed by using an alloy target of zinc and aluminum (a proportion of aluminum being 5.0 atomic % relative to the total amount of zinc and aluminum) at a gas flow ratio of $Ar/O_2 = 10/9$ at a power density of 3.6 W/cm$^2$. Further, the titanium oxide layer was formed by using a titanium target at a gas flow ratio of Ar/02=6/4 at a power density of 3.6 W/cm$^2$.

The silver layer was formed by using a silver target with an introduction gas of Ar 100% at a power density of 4.0 W/cm$^2$. The titanium layer was formed by using a titanium target with an introduction gas of Ar 100% at a power density of 0.7 W/cm$^2$.

The nickel-aluminum alloy layer was formed by using a nickel-aluminum alloy target (a proportion of nickel being 80 mass % relative to the total amount of nickel and aluminum) with an introduction gas of Ar 100% at a power density of 0.7 W/cm$^2$.

The tin-doped zinc oxide layer was formed by using a zinc-tin alloy target (a proportion of tin being 50 mass % relative to the total amount of zinc and tin) at a gas flow ratio of Ar/02=10/9 at a power density of 0.7 W/cm$^2$.

TABLE 1

|  | Structure | Thickness |
| --- | --- | --- |
| Second dielectric layer | Aluminum-doped zinc oxide | 7 nm |
|  | Tin-doped zinc oxide | 33 nm |
| First barrier layer | Titanium | 1 nm |

TABLE 1-continued

| | Structure | Thickness |
|---|---|---|
| Light-absorbing layer | Nickel-aluminum alloy | 2 nm |
| Second barrier layer | Titanium | 1 nm |
| Silver layer | Silver | 17.5 nm |
| First dielectric layer | Aluminum-doped zinc oxide | 13 nm |
| | Titanium oxide (TiO$_2$) | 8 nm |
| Transparent substrate | Glass plate | 3 mm |

After film formation, the laminate was subjected to a heat treatment at 730° C. in the air for 4 minutes. Of the laminate after the heat treatment, the visible light transmittance (Tv, unit: %), the visible light reflectance (Rv, unit: %) on the substrate side and the visible light reflectance (RV, unit: %) on the membrane side were obtained. Further, of the laminate after the heat treatment, the color tones of the transmitted light, the reflected light on the substrate side and the reflected light on the membrane side were obtained by a*b* in the CIE-Lab colorimetric system.

The visible light transmittance (Tv) and the visible light reflectance (Rv) were obtained by measuring the visible light transmittance at wavelengths of from 300 to 2,500 nm using U-4100 spectrophotometer manufactured by Hitachi, Ltd. in accordance with JIS R3106:1998. The solar transmittance (Te, unit: %) was obtained by measuring the solar transmittance at wavelengths of from 300 to 2,100 nm in accordance with JIS R3106:1998. The color tones of the transmitted light and the reflected light were obtained by measuring a* and b* in the L*a*b* colorimetric system based on JIS Z8722, and a* and b* were calculated in accordance with JIS Z8729. The results are shown in Table 2. The solar heat gain coefficient (SHGC) is a scale indicating heat shielding properties, that is, how the heat generated by the sunlight is shielded. Specifically, it is a proportion of the incident solar radiation which enters from the glass side and is directly transmitted, and the incident solar radiation which is absorbed and then emitted to the membrane side. The solar heat gain coefficient is represented by a number ranging from 0 to 1. A lower solar heat gain coefficient represents less solar heat transmitted. The solar heat gain coefficient (SHGC) is an index employed by National Fenestration Rating Council. The solar heat gain coefficient (SHGC) was calculated based on an embodiment such that using double glazing with an air layer of 12 mm, one of facing glass plates being the laminate in Example 1 (the thickness of the glass plate was 3 mm, and the laminated membrane was disposed on the air layer side), and the other being a clear glass plate (the thickness of the glass plate was 6 mm), and the sunlight entered from the 3 mm glass plate side of the laminate.

Further, of the laminate before the heat treatment and the laminate after the heat treatment, the haze (unit: %) was measured in accordance with JIS K6714. Further, of the laminate before the heat treatment and the laminate after the heat treatment, the sheet resistance (unit: Ω/□) was measured by a 4-probe method. The results are shown in Table 3.

TABLE 2

| Transmission | Tv | 70.2 |
|---|---|---|
| | a* | −4.584 |
| | b* | 6.304 |
| Reflection (membrane side) | Rv | 20.2 |
| | a* | 7.151 |
| | b* | −6.240 |
| Reflection (substrate side) | Rv | 23.7 |
| | a* | 4.746 |
| | b* | −6.239 |
| SHGC | | 0.440 |
| Te | | 47.1 |

TABLE 3

| Haze | Before heat treatment | 0.10 |
|---|---|---|
| | After heat treatment | 0.51 |
| Sheet resistance | Before heat treatment | 2.52 |
| | After heat treatment | 2.33 |

Example 2

The laminate having a membrane structure as shown in Table 4 was prepared by a sputtering method. That is, the same laminate as in Example 1 was formed except that as the first barrier layer, a zinc-tin alloy layer (a proportion of tin being 50 mass % relative to the total amount of zinc and tin) was formed instead of the titanium layer. The zinc-tin alloy layer was formed by using a zinc-tin alloy target (a proportion of tin being 50 mass % relative to the total amount of zinc and tin) at a gas flow ratio of Ar/O$_2$=10/9 at a power density of 3.6 W/cm$^2$. The other layers were formed under the same conditions as in Example 1. Then, the heat treatment was carried out in the same manner as in Example 1, whereupon the optical properties, the haze and the sheet resistance were measured. The results are shown in Tables 5 and 6.

TABLE 4

| | Structure | Thickness |
|---|---|---|
| Second dielectric layer | Aluminum-doped zinc oxide | 5 nm |
| | Tin-doped zinc oxide | 33 nm |
| First barrier layer | Zinc-tin alloy | 1.8 nm |
| Light-absorbing layer | Nickel-aluminum alloy | 3 nm |
| Second barrier layer | Zinc-tin alloy | 1 nm |
| Silver layer | Silver | 15 nm |
| First dielectric layer | Aluminum-doped zinc oxide | 24 nm |
| Transparent substrate | Glass plate | 3 mm |

TABLE 5

| Transmission | Tv | 69.0 |
|---|---|---|
| | a* | −1.294 |
| | b* | 7.185 |
| Reflection (membrane side) | Rv | 15.7 |
| | a* | 1.959 |
| | b* | −14.07 |
| Reflection (substrate side) | Rv | 22.4 |
| | a* | −1.474 |
| | b* | −8.190 |
| SHGC | | 0.438 |
| Te | | 46.1 |

TABLE 6

| Haze | Before heat treatment | 0.10 |
|---|---|---|
| | After heat treatment | 0.44 |

TABLE 6-continued

| Sheet resistance | Before heat treatment | 3.82 |
|---|---|---|
| | After heat treatment | 3.63 |

Example 3

A laminate having a membrane structure as shown in Table 7 was prepared by a sputtering method. The chromium nitride ($CrN_x(x=1.0)$) layer as a light-absorbing layer was formed by using a Cr target at a gas flow ratio of Ar/N2=80/20 at a power density of 1.4 W/cm$^2$. The titanium nitride layer as an upper barrier layer was formed by using a Ti target at a gas flow ratio of Ar/N2=70/30 at a power density of 3.6 W/cm$^2$. The titanium oxide layer as an upper protective layer was formed by using a Ti target at a gas flow ratio of Ar/N2=60/40 at a power density of 3.6 W/cm$^2$. The other layers were formed under the same conditions as in Example 1. Then, the heat treatment was carried out in the same manner as in Example 1, whereupon the optical properties, the haze and the sheet resistance were measured. The results are shown in Tables 8 and 9.

TABLE 7

| | Structure | Thickness |
|---|---|---|
| Upper protective layer | Titanium oxide ($TiO_2$) | 2.5 nm |
| Upper barrier layer | Titanium nitride (TiN) | 2.5 nm |
| Second dielectric layer | Aluminum-doped zinc oxide | 3 nm |
| | Tin-doped zinc oxide | 37 nm |
| First barrier layer | Titanium | 2.5 nm |
| Light-absorbing layer | Chromium nitride ($CrN_x(x = 1.0)$) | 1.8 nm |
| Silver layer | Silver | 16 nm |
| First dielectric layer | Aluminum-doped zinc oxide | 30 nm |
| Transparent substrate | Glass plate | 3 mm |

TABLE 8

| Transmission | Tv | 66.9 |
|---|---|---|
| | a* | −0.636 |
| | b* | 6.476 |
| Reflection (membrane side) | Rv | 17.7 |
| | a* | 1.401 |
| | b* | −12.87 |
| Reflection (substrate side) | Rv | 25.2 |
| | a* | −2.685 |
| | b* | −8.395 |
| SHGC | | 0.416 |
| Te | | 43.8 |

TABLE 9

| Haze | Before heat treatment | 0.10 |
|---|---|---|
| | After heat treatment | 0.25 |
| Sheet resistance | Before heat treatment | 3.48 |
| | After heat treatment | 3.25 |

Example 4

A laminate having a membrane structure as shown in Table 10 was prepared by a sputtering method. That is, layers were formed under the same conditions as in Example 3 except that thicknesses of some of the layers were changed. Then, the heat treatment was carried out in the same manner as in Example 1, whereupon the optical properties, the haze and the sheet resistance were measured. The results are shown in Tables 11 and 12.

TABLE 10

| | Structure | Thickness |
|---|---|---|
| Upper protective layer | Titanium oxide ($TiO_2$) | 2.0 nm |
| Upper barrier layer | Titanium nitride (TiN) | 3.4 nm |
| Second dielectric layer | Aluminum-doped zinc oxide | 40 nm |
| | Tin-doped zinc oxide | 3 nm |
| First barrier layer | Titanium | 2.5 nm |
| Light-absorbing layer | Chromium nitride ($CrN_x(x = 1.0)$) | 1.9 nm |
| Silver layer | Silver | 14 nm |
| First dielectric layer | Aluminum-doped zinc oxide | 30 nm |
| Transparent substrate | Glass plate | 3 mm |

TABLE 11

| Transmission | Tv | 64.8 |
|---|---|---|
| | a* | −0.051 |
| | b* | 8.261 |
| Reflection (membrane side) | Rv | 15.8 |
| | a* | −0.376 |
| | b* | −16.00 |
| Reflection (substrate side) | Rv | 25.0 |
| | a* | −5.146 |
| | b* | −5.860 |
| SHGC | | 0.428 |
| Te | | 45.2 |

TABLE 12

| Haze | Before heat treatment | 0.04 |
|---|---|---|
| | After heat treatment | 0.18 |
| Sheet resistance | Before heat treatment | 2.99 |
| | After heat treatment | 2.55 |

Example 5

A laminate having a membrane structure as shown in Table 13 was prepared by a sputtering method. That is, layers were formed under the same conditions as in Example 3 except that thicknesses of some of the layers were changed. Then, the heat treatment was carried out in the same manner as in Example 1, whereupon the optical properties, the haze and the sheet resistance were measured. The results are shown in Tables 14 and 15.

TABLE 13

| | Structure | Thickness |
|---|---|---|
| Upper protective layer | Titanium oxide ($TiO_2$) | 1 nm |
| Upper barrier layer | Titanium nitride (TiN) | 3.4 nm |
| Second dielectric layer | Aluminum-doped zinc oxide | 37 nm |
| | Tin-doped zinc oxide | 3 nm |
| First barrier layer | Titanium | 2.5 nm |
| Light-absorbing layer | Chromium nitride ($CrN_x(x = 1.0)$) | 1.9 nm |
| Silver layer | Silver | 14 nm |
| First dielectric layer | Aluminum-doped zinc oxide | 30 nm |
| Transparent substrate | Glass plate | 3 mm |

TABLE 14

| Transmission | Tv | 69.0 |
|---|---|---|
| | a* | −1.033 |
| | b* | 7.786 |

TABLE 14-continued

| | | |
|---|---|---|
| Reflection (membrane side) | Rv | 13.5 |
| | a* | 1.025 |
| | b* | −17.11 |
| Reflection (substrate side) | Rv | 22.04 |
| | a* | −4.010 |
| | b* | −7.369 |
| SHGC | | 0.438 |
| Te | | 46.4 |

TABLE 15

| | | |
|---|---|---|
| Haze | Before heat treatment | 0.10 |
| | After heat treatment | 0.13 |
| Sheet resistance | Before heat treatment | 3.13 |
| | After heat treatment | 2.69 |

Example 6

A laminate having a membrane structure as shown in Table 16 was prepared by a sputtering method. The titanium nitride ($TiN_x(x=1.0)$) layer as an upper barrier layer was formed by using a Ti target at a gas flow ratio of Ar/N2=70/30 at a power density of 3.6 W/cm². The carbon layer as a protective layer was formed by using a carbon target with an introduction gas of Ar 100% at a power density of 2.1 W/cm². The other layers were formed under the same conditions as in the other Examples. Then, the heat treatment was carried out in the same manner as in Example 1, whereupon the optical properties, the haze and the sheet resistance were measured. The results are shown in Tables 17 and 18.

TABLE 16

| | Structure | Thickness |
|---|---|---|
| Upper protective layer | Carbon | 3 nm |
| Upper barrier layer | Titanium nitride (TiNx(x = 1.0)) | 3.4 nm |
| Second dielectric layer | Tin-doped zinc oxide | 18 nm |
| | Aluminum-doped zinc oxide | 20 nm |
| First barrier layer | Titanium | 2.8 nm |
| Light-absorbing layer | Chromium nitride ($CrN_x(x = 1.0)$) | 1.8 nm |
| Silver layer | Silver | 15 nm |
| First dielectric layer | Aluminum-doped zinc oxide | 6 nm |
| | Tin-doped zinc oxide | 21 nm |
| Transparent substrate | Glass plate | 3 mm |

TABLE 17

| | | |
|---|---|---|
| Transmission | Tv | 67.1 |
| | a* | −1.738 |
| | b* | 6.910 |
| Reflection (membrane side) | Rv | 15.1 |
| | a* | 3.320 |
| | b* | −15.995 |
| Reflection (substrate side) | Rv | 23.9 |
| | a* | −1.940 |
| | b* | −8.441 |
| SHGC | | 0.404 |
| Te | | 42.2 |

TABLE 18

| | | |
|---|---|---|
| Haze | Before heat treatment | 0.02 |
| | After heat treatment | 0.17 |

TABLE 18-continued

| | | |
|---|---|---|
| Sheet resistance | Before heat treatment | 2.76 |
| | After heat treatment | 2.39 |

Comparative Example 1

A laminate having a membrane structure as shown in Table 19 was prepared by a sputtering method. The titanium nitride ($TiN_x(x=1.0)$) layer as an upper barrier layer was formed by using a Ti target at a gas flow ratio of Ar/N2=70130 at a power density of 3.6 W/cm². The carbon layer as a protective layer was formed by using a carbon target with an introduction gas of Ar 100% at a power density of 2.1 W/cm². The other layers were formed under the same conditions as in the other Examples, for example, Example 6. Then, the heat treatment was carried out in the same manner as in Example 1, whereupon the optical properties, the haze and the sheet resistance were measured. The results are shown in Tables 20 and 21.

TABLE 19

| | Structure | Thickness |
|---|---|---|
| Upper protective layer | Carbon | 3 nm |
| Upper barrier layer | Titanium nitride (TiNx(x = 1.0)) | 3.4 nm |
| Second dielectric layer | Tin-doped zinc oxide | 18 nm |
| | Aluminum-doped zinc oxide | 20 nm |
| First barrier layer | Titanium | 5 nm |
| Silver layer | Silver | 15 nm |
| First dielectric layer | Aluminum-doped zinc oxide | 6 nm |
| | Tin-doped zinc oxide | 21 nm |
| Transparent substrate | Glass plate | 3 mm |

TABLE 20

| | | |
|---|---|---|
| Transmission | Tv | 70.1 |
| | a* | −1.737 |
| | b* | 7.509 |
| Reflection (membrane side) | Rv | 10.1 |
| | a* | 1.250 |
| | b* | −10.988 |
| Reflection (substrate side) | Rv | 10.9 |
| | a* | −0.550 |
| | b* | −4.332 |
| SHGC | | 0.470 |
| Te | | 48.2 |

TABLE 21

| | | |
|---|---|---|
| Haze | Before heat treatment | 0.02 |
| | After heat treatment | 1.65 |
| Sheet resistance | Before heat treatment | 2.76 |
| | After heat treatment | 3.21 |

As evident from Examples 1 to 6, according to a laminate having, in order from the transparent substrate side, a first dielectric layer, a silver layer, a second barrier layer, a light-absorbing layer, a first barrier layer and a second dielectric layer, or a first dielectric layer, a silver layer, a light-absorbing layer, a first barrier layer and a second dielectric layer, a decrease of optical properties and occurrence of a haze due to the heat treatment can be suppressed.

INDUSTRIAL APPLICABILITY

According to the present invention, it is possible to obtain a laminate of which changes of optical properties and occurrence of a haze due to a heat treatment are suppressed, and such a laminate is useful particularly as Low-E glass for a building or a window glass for an automobile.

This application is a continuation of PCT Application No. PCT/JP2013/069829 filed on Jul. 22, 2013, which is based upon and claims the benefit of priority from Japanese Patent Application No. 2012-163954 filed on Jul. 24, 2012. The contents of those applications are incorporated herein by reference in their entireties.

REFERENCE SYMBOLS

10: laminate, 11: transparent substrate, 12: lamented membrane, 13: first dielectric layer, 14: silver layer, 15: second barrier layer, 16: light-absorbing layer, 17: first barrier layer, 18: second dielectric layer, 181: lower dielectric layer, 182: upper dielectric layer, 20: double glazing, 21: glass plate, 22: spacer, 23: primary sealing material, 24: secondary sealing material, 25: penetrating pore, 26: hollow layer, 27: drying agent

What is claimed is:

1. A laminate, comprising the following layers in order:
   a transparent substrate having a thickness of 1 to 20 mm;
   a first dielectric layer having a thickness of 25 to 50 nm;
   a silver layer having a thickness of 5 to 25 nm;
   a light-absorbing layer having a thickness of 1 to 10 nm;
   a first barrier layer having a thickness of from 1 to 10 nm; and
   a second dielectric layer having a thickness of from 25 to 50 nm;
   wherein:
   the first dielectric layer is in contact with the transparent substrate;
   a single silver layer is present in the laminate between the first dielectric layer and the second dielectric layer;
   the light-absorbing layer is in contact with the silver layer and the first barrier layer;
   the transparent substrate is an inorganic transparent glass plate;
   the first dielectric layer comprises a metal oxide;
   the silver layer comprises silver or a silver alloy;
   the light-absorbing layer is made of chromium nitride;
   the first barrier layer is made of titanium or a zinc-tin alloy;
   the second dielectric layer comprises at least one of a metal oxide and a metal nitride;
   a visible light transmittance of the laminate is from 60 to 75% after the laminate is subjected to a heat treatment; and
   after the laminate is subjected to a heat treatment:
      a visible light reflectance on a transparent substrate side of the laminate is from 15 to 26%;
      a visible light reflectance on a side of the laminate opposite from the transparent substrate side is from 12 to 21%; and
      a difference between the visible light reflectance on the transparent substrate side and the visible light reflectance on the side of the laminate opposite from the transparent substrate side is at least 5%.

2. The laminate according to claim 1, wherein the laminate has a haze after a heat treatment of 0 to 1.0% determined in accordance with JIS K6714.

3. The laminate according to claim 1, wherein the laminate has a sheet resistance after a heat treatment of 0.1 to 20 Ω/□.

4. The laminate according to claim 1, wherein a thickness of the first dielectric layer is 25 to 40 nm.

5. The laminate according to claim 1, wherein a thickness of the light absorbing layer is 1 to 5 nm.

6. The laminate according to claim 1, wherein a thickness of the first barrier layer is 1 to 5 nm.

7. The laminate according to claim 1, wherein the first barrier layer is made of a zinc-tin alloy.

8. A laminate, comprising:
   a glass plate;
   a first tin-doped zinc oxide layer in contact with the glass plate;
   a first aluminum-doped zinc oxide layer in contact with the first tin-doped zinc oxide layer;
   a silver layer in contact with the aluminum-doped zinc oxide layer;
   a chromium nitride layer in contact with the silver layer;
   a titanium layer in contact with the chromium nitride layer;
   a second aluminum-doped zinc oxide layer in contact with the titanium layer;
   a second tin-doped zinc oxide layer in contact with the second aluminum-doped zinc oxide layer;
   a titanium nitride layer in contact with the second tin-doped zinc oxide layer;
   a titanium oxide layer in contact with the titanium nitride layer; and
   a carbon layer.

9. The laminate according to claim 8, wherein:
   the first tin-doped zinc oxide layer has a thickness of 1 to 50 nm;
   the first aluminum-doped zinc oxide layer has a thickness of 1 to 50 nm;
   the silver layer has a thickness of 5 to 30 nm;
   the chromium nitride layer has a thickness of 1 to 5 nm;
   the titanium layer has a thickness of 1 to 5 nm;
   the second aluminum-doped zinc oxide layer has a thickness of 1 to 100 nm;
   the second tin-doped zinc oxide layer has a thickness of 1 to 100 nm;
   the titanium nitride layer has a thickness of 0.5 to 10 nm;
   the titanium oxide layer has a thickness of 1 to 10 nm; and
   the carbon layer has a thickness of 1 to 10 nm.

* * * * *